United States Patent Office 3,497,330
Patented Feb. 24, 1970

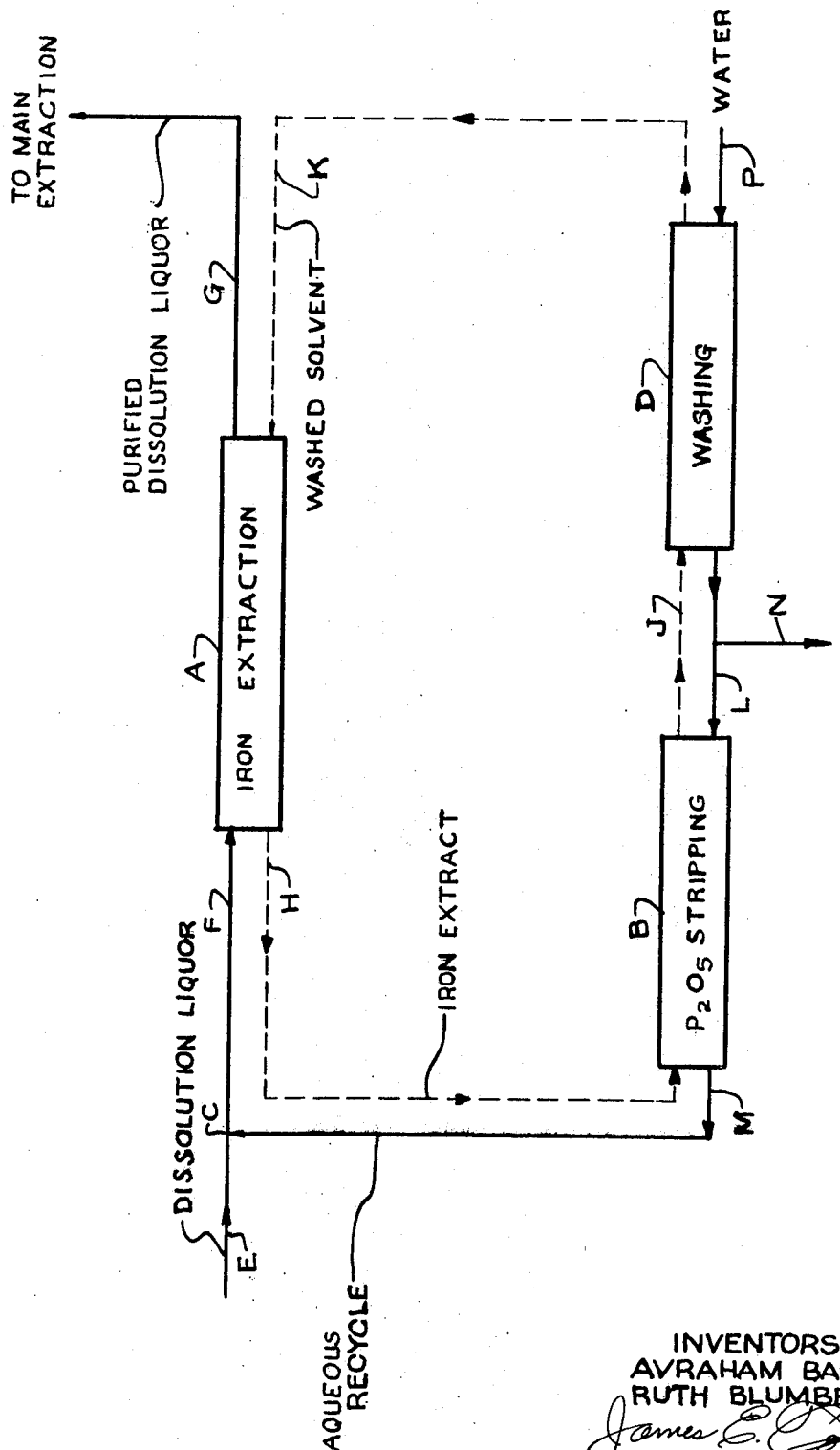

3,497,330
SOLVENT EXTRACTION OF IRON FROM
PHOSPHORIC ACID
Avraham M. Baniel, Haifa, and Ruth Blumberg, Mount
Carmel, Haifa, Israel, assignors to Kaiser Aluminum &
Chemical Corporation, Oakland, Calif.
Filed Feb. 8, 1965, Ser. No. 430,853
Int. Cl. C01b 25/22, 25/18; B01d 11/04
U.S. Cl. 23—312                                  6 Claims

ABSTRACT OF THE DISCLOSURE

Substantially iron ion free phosphoric acid is produced. Phosphate containing rock is decomposed with aqueous hydrochloric acid and the formed aqueous solution is admixed with an aliphatic solvent having from 5 to 18 carbon atoms. The iron ions are removed from this admixture, leaving behind an iron ion free extract from which the phosphoric acid is recovered.

---

The present invention generally relates to a method of removing iron from aqueous solutions containing phosphoric acid, hydrochloric acid, and chlorides of iron.

More particularly the invention relates to a method of removing iron from aqueous solutions resulting from the reaction of hydrochloric acid on phosphate rock and containing phosphoric acid, hydrochloric acid, and chlorides of iron and of other cations present in phosphate rock.

Phosphate rock consists mainly of tricalcium phosphate along with impurities, which may include iron in amounts reaching as high as 10 to 15% $Fe_2O_3$. For example, Moroccan and Kola phosphate rocks may contain from about 0.1 to 0.7% $Fe_2O_3$, Florida pebble from about 1 to 2% $Fe_2O_3$, Tennessee brown rock from about 2.2 to 3.4% $Fe_2O_3$, and mixed apatite-iron ores such as the Rocky Mountain and leached zone ores from 10 to 15% $Fe_2O_3$.

The production of phosphoric acid from phosphate rock such as Moroccan, Kola and Florida pebble rock, by the process set out, for example, in Baniel and Blumberg U.S. Patent 2,880,063, results in phosphoric acid which is of a quality and concentration much superior to that obtained by the conventional "wet process" (acidulation with sulphuric acid) from the same rocks. Even so, phosphoric acid produced by the aforesaid Baniel and Blumberg process does not—without further purification—meet the standards which exist for certain pharmaceutical and food uses, since it contains some of the iron content present in the phosphate rock, and for such specialized uses, even very small amounts of iron are undesirable.

While the problem of removing iron from the dissolution liquor resulting from acidulation of phosphate rock with hydrochloric acid exists where any type of rock phosphate is used as the raw material, it is particularly vexing when the rock phosphates have a high iron content. Not only is the presence of iron in the finally obtained phosphoric acid deleterious for the above-mentioned reasons, but additionally the presence of iron in the dissolution liquor represses the solubility of phosphoric acid in the solvent, and makes solvent extraction of the $P_2O_5$ content from such liquors more difficult, as will be pointed out hereinafter.

Our procedure for iron removal is particularly applicable to, but by no means limited to, the production of iron-free or substantially iron-free phosphate rock dissolution liquors for further processing by the solvent extraction procedures for phosphoric acid recovery described in the aforesaid Baniel and Blumberg patent. Our process is also applicable to the production of iron-free phosphate rock dissolution liquors obtained by other methods, for example by absorption of HCl from by-product gas mixtures dilute in HCl in a phosphate rock slurry. In such a process the decomposition of phosphate rock and absorption of HCl are effected concurrently resulting directly in the production of a phosphate rock dissolution liquor.

Following the procedure set out in for example, the Baniel and Blumberg patent, acidulation of phosphate rock with aqueous hydrochloric acid results in a dissolution liquor containing phosphoric acid, hydrochloric acid and the chlorides of the cations, e.g., calcium, iron, and magnesium, present in the rock. By the use of suitable solvents, for example, lower aliphatic alcohols, ketones and certain groups of amides, some of which are described in the patent, the phosphoric acid is recovered from such dissolution liquor.

To obtain a favorable distribution coefficient of $P_2O_5$ toward the solvent used to extract it, the decomposition of the phosphate rock should be effected with an excess of hydrochloric acid over the equivalent of the phosphoric acid content of the phosphate. But on the other hand, use of excess hydrochloric acid results in the undesirable coextraction of that free hydrochloric acid by the organic solvent used for extracting the phosphoric acid; for the latter reason it is advantageous to have as little excess hydrochloric acid present as possible, so as not to unduly burden the ensuing concentration and recovery operations which are included in the Baniel and Blumberg process.

While the foregoing process has been shown to be very successful commercially for producing high quality phosphoric acid, yet as mentioned above, even in such a selective procedure some iron is extracted by the solvent, along with the phosphoric acid, and remains in the recovered product as a contaminant.

It is therefore an object of the present invention to provide a procedure for removing iron from aqueous solutions containing phosphoric acid, hydrochloric acid and chlorides of cations, including iron, present in phosphate rock.

An additional object of this invention is to provide a method of removing iron from dissolution liquor resulting from the reaction of hydrochloric acid on phosphate rock.

It is an additional object of the invention to effect the removal of iron from an aqueous solution containing phosphoric acid, hydrochloric acid, and chlorides of cations present in phosphate rock, without adding further contaminants to the solution.

A still further object of the invention is to provide a procedure which results in the production of an aqueous solution containing phosphoric acid, hydrochloric acid and chlorides of cations present in phosphate rock, said solution being substantially free of iron, and adaptable for the ready and efficient recovery of phosphoric acid therefrom by known solvent extraction procedures. The attainment of these and other objects and advantages of this invention will be further apparent from the following detailed description, given in connection with the attached drawing which shows a diagrammatic flow sheet of an illustrative embodiment of the process wherein the broken lines indicate the flow of the solvent stream and the solid lines indicate the flow of the aqueous stream.

As shown in the drawing, dissolution liquor resulting from the reaction of hydrochloric acid and phosphate rock, and containing phosphoric acid, chlorides of cations present in phosphate rock including iron, and preferably from about 40 to about 60 grams per liter of hydrochloric acid (i.e., from about 1.1 to 1.6 N) is delivered through lines E and F to a liquid-liquid extractor of conventional design, such as a multi-stage mixer-settler, shown at A, where it is contacted with a predetermined, limited amount of an organic solvent, introduced through line K, resulting in the extraction of iron, along with some phosphoric acid. The iron is, we believe, in the form of the complex $HFeCl_4$ and dissolves readily in the solvent even at the relatively low hydrochloric acid concentration of the dissolution liquor, and despite the solution-impeding effect of the phosphoric acid. We believe that the ready solubility of the iron in the solvent is due at least partly to the chlorides present in the liquor particularly the calcium chloride.

The resulting extract, on leaving the extractor A through line H contains, as above mentioned, the iron complex and some phosphoric acid, and may have an iron content of for example, about 20.0 grams per liter or more compared with an iron content of 2.5 grams per liter in the original dissolution liquor. This iron-rich extract proceeds through line H to a stripper B which may be a liquid-liquid extraction system of conventional design such as a multi-stage mixer-settler, in which phosphoric acid is stripped from the extract by contacting it with an aqueous reflux containing ferric chloride and hydrochloric acid and introduced through line L. The resulting aqueous recycle containing, for example, about 40 grams per liter of iron, and some $P_2O_5$, returns to the dissolution liquor stream through line M as shown at C. On leaving the stripper B, the extract containing iron and hydrochloric acid is passed through line J to a washing means D where it is subjected to a washing step by being counter-currently contacted with water introduced through line P in a conventional liquid-liquid extraction means, the iron removed therefrom by dissolution in the water, and the resulting aqueous ferric chloride concentrate delivered partly to the stripper at B and partly removed from the system through line N from which it is either discharged to waste or treated for recovery of its ferric chloride or other values.

From the washer D, the washed solvent is returned to the extractor A through the line K as shown, for the counter-current extraction of the iron content of the dissolution liquor. After the iron extraction step in extractor A, the purified dissolution liquor passing through line G, now essentially iron-free, is ready for use as the input dissolution liquor whose phosphoric acid content is to be recovered, preferably by a solvent extraction procedure such as shown and described in the aforesaid U.S. Patent 2,880,063. There may be many variations of the process illustrated in the drawing. For example, the stripper B may be eliminated when solvent that is employed is highly selective for iron or when the cost of constructing and operating the stripper is not justified by the amount of $P_2O_5$ recovered from the solvent stream.

It is an essential feature of our invention that the volume of solvent used to effect the efficient extraction of iron, in accordance with out invention, is much lower than the volume of solvent used for phosphoric acid extraction in the process described in the aforesaid patent.

In our process the volume of solvent used for extraction of iron from the dissolution liquor is less than the volume of the liquor, and is preferably in the proportion of from about 0.1 to about 0.2 volume of solvent per volume of dissolution liquor.

In general, although the process described includes a circulating inventory of iron in both the solvent and the aqueous streams, substantially all of the iron entering the system at E is removed from the system at N, and substantially all of the $P_2O_5$ entering the system at E is recovered in the aqueous stream at G.

As an illustrative specific example of a process in accordance with our invention and with the flow diagram just described, the composition of the streams at the various points of the process illustrated in the flow sheet, are as shown in the following Table A:

TABLE A

| | Concentration, g./l. | | | | | | |
|---|---|---|---|---|---|---|---|
| | E | F | G | H | J | K | N |
| $P_2O_5$ | 100 | 104 | 100 | 40.7 | 0 | 0 | 0 |
| HCl | 60 | 61.5 | 53 | 50 | 50 | 0 | 100 |
| $H_2O$ | 825 | 830 | 830 | 90 | 88 | 68 | |
| $CaCl_2$ | 330 | 290 | 330 | 1.7 | 1.7 | 0 | 3.3 |
| Fe | 2.5 | 4.0 | 0.07 | 17.6 | 17.6 | 0 | 40 |
| Iso-amyl alcohol | | | | 666 | 666 | 750 | 20 |

Among the solvents which may be used in our process of pre-extraction of iron are the aliphatic alcohols; ketones; and esters, containing from 5 to 18 carbon atoms, including those solvents disclosed in U.S. Patent No. 2,880,063, namely lower aliphatic alcohols and ketones of limited mutual miscibility with water; and mixtures of any of the foregoing with organic liquids, such as nitrobenzene, which have a high dielectric constant and function as co-solvents.

Tables B, C, D, E, F and G below illustrate embodiments of our invention in which solvents other than the iso-amyl alcohol illustrated in Table A were used.

TABLE B
[Amyl acetate solvent]

| | Concentration in grams per liter | | |
|---|---|---|---|
| | E | H | G |
| $P_2O_5$ | 110 | 9.2 | 100 |
| Fe | 2.7 | 25.8 | 0.01 |

TABLE C
[Di-iso butyl ketone solvent]

| | Concentration in grams per liter | | |
|---|---|---|---|
| | E | H | G |
| $P_2O_5$ | 100 | 2.8 | 101 |
| Fe | 3.1 | 17.4 | 0.005 |

TABLE D
[Hexanol solvent]

| | Concentration in grams per liter | | |
|---|---|---|---|
| | E | H | G |
| $P_2O_5$ | 100 | 22.6 | 95.5 |
| Fe | 3.6 | 26.9 | 0.07 |

TABLE E
[Octanol solvent]

| | Concentration in grams per liter | | |
|---|---|---|---|
| | E | H | G |
| $P_2O_5$ | 100 | 20 | 96 |
| Fe | 3.1 | 25.2 | 0.07 |

TABLE F
[Cyclohexanone solvent]

| | Concentration in grams per liter | | |
|---|---|---|---|
| | E | H | G |
| $P_2O_5$ | 100 | 21.4 | 100 |
| Fe | 4.5 | 77.5 | 0.005 |

TABLE G
[1:1 molar ratio mixed iso-amyl alcohol and nitro benzene solvent]

| | Concentration in grams per liter | | |
|---|---|---|---|
| | E | H | G |
| $P_2O_5$ | 101 | 10.2 | 102 |
| Fe | 4.6 | 31.0 | 0.19 |

Regarding the use of the co-solvents, e.g., nitrobenzene shown in Table G above, we have found that nitrobenzene by itself has no extraction power towards phosphoric acid; we also have found, unexpectedly, that by mixing nitrobenzene with an aliphatic alcohol—for example, that it exerted an inhibitory effect on the solution of phosphoric acid. With such a co-solvent system using iso-amyl alcohol and nitrobenzene as the co-solvents it appears, then, that a double synergistic effect occurs in which the extractibility of iron is increased while that of the phosphoric acid is decreased. An example of this is set out in Table H below:

TABLE H.—LIMITING CONCENTRATIONS FOR MIXTURES of ISO-AMYL ALCOHOL NITROBENZENE AND DISSOLUTION LIQUOR
[Mixed solvent phase]

| Molar ratio nitrobenzene to iso-amyl alcohol | $P_2O_5$, g./l. | Fe, g./l. | Remarks |
|---|---|---|---|
| 0 | 40.7 | 17.6 | Using iso-amyl alcohol with a dissolution mixture containing 2.8 g./l. Fe and 98 g./l. $P_2O_5$. |
| 0.3 | 21.0 | 30.0 | Do. |
| 0.6 | 12.4 | 29.2 | Do. |
| 1 | 6.0 | 24.8 | Do. |
| 3 | 2.5 | 16.9 | Do. |

Consideration of the figures in Table H, illustrates the synergistic effect mentioned above. Thus, at a molar ratio of 0.3 nitrobenzene to amylalcohol, the iron content in the solvent reached a maximum and the $P_2O_5$ decreased appreciably with increasing amounts of nitrobenzene.

From Tables D and E above, it will be seen that at a given free hydrochloric acid level the extraction capacity for ferric iron of alcohols such as n-hexanol, and n-octanol is somewhat higher than that of iso-myl alcohol (17.6 grams per liter) but that the $P_2O_5$ which is co-extracted is much less than is the case with iso-myl alcohol (40.7 grams per liter).

From Table J, below, it is seen that amyl acetate is even more efficient than hexanol and octanol due to its high extraction power towards ferric chloride and its correspondingly low extraction power towards phosphoric acid.

TABLE J.—MULTISTAGE COUNTERCURRENT EXTRACTION MIXTURE WITH AMYL ACETATE
[In grams/liter]

| | H | $P_2O_5$ | Fe | Cl | HCl |
|---|---|---|---|---|---|
| Dissolution liquor feed | 3.0 | 110 | 2.7 | 244 | 53 |
| Aqueous phase after extraction | | 100 | 0.010 | 224 | |
| Solvent phase after extraction | | 9.2 | 25.8 | 67.5 | |

From the table above it is seen that amyl acetate shows a relatively low extraction power for $P_2O_5$ (9.2 grams per liter) and a fairly high one for iron. Using this solvent, the iron in the dissolution liquor was reduced from 2.7 grams per liter to 10 parts per million. The amount of $P_2O_5$ which was co-extracted with the ferric iron would constitute a loss of only 0.85% on initial $P_2O_5$ if no further recovery step is made.

From the foregoing detailed description of our invention it is clear that there is provided here an improved process for producing from aqueous solutions containing phosphoric acid, hydrochloric acid and chlorides of cations, especially iron, such as are found in phosphate rock, phosphoric acid of high purity and concentration can be readily extracted by known solvent extraction techniques.

While we have disclosed a preferred embodiment of our invention, it is understood that the details thereof may be varied within the scope of the following claims.

We claim:
1. The method for producing substantially iron ion free phosphoric acid solution from an aqueous liquor containing iron ions, hydrochloric acid, phosphoric acid and chlorides of cations present in ferruginous phosphate rock by a selective extraction of the iron ions from such liquor which comprises:
    (a) admixing the liquor with an organic solvent of limited mutual miscibility with water and selected from the group consisting of aliphatic alcohols, ketones and esters having from 5 to 18 carbon atoms, in a volume ratio of from about 1 volume of solvent to about 5–10 volumes of liquor to provide a substantially iron ion free aqueous phase and an iron ion rich organic extract which is substantially free of phosphoric acid,
    (b) separating the iron ion free aqueous phase from the iron ion rich organic extract, and
    (c) recovering phosphoric acid from the substantially iron ion free aqueous phase.
2. The method of claim 1 wherein the solvent is iso-amyl alcohol.
3. The method of claim 1 wherein the solvent is an aliphatic alcohol containing more than 5 carbon atoms.
4. The method of claim 1 wherein said liquor contains from about 40 to about 80 grams per liter of hydrochloric acid.
5. The method of claim 1 wherein the solvent is amyl acetate.
6. The method of claim 1 wherein the said solvent is admixed with nitrobenzene.

References Cited
UNITED STATES PATENTS

| | | | |
|---|---|---|---|
| 2,847,279 | 8/1958 | Tucker | 23—312 X |
| 2,880,063 | 3/1959 | Baniel | 23—165 |
| 3,072,461 | 1/1963 | Long | 23—165 |
| 3,318,661 | 5/1967 | Schallert | 23—312 X |
| 3,338,674 | 8/1967 | Baniel | 23—165 |

FOREIGN PATENTS

| | | |
|---|---|---|
| 148,385 | /1962 | U.S.S.R. |
| 672,008 | 10/1963 | Canada. |

NORMAN YUDKOFF, Primary Examiner

S. J. EMERY, Assistant Examiner

U.S. Cl. X.R.

23—51, 165

UNITED STATES PATENT OFFICE
CERTIFICATE OF CORRECTION

Patent No. 3,497,330          Dated February 24, 1970

Inventor(s) Avraham M. Baniel and Ruth Blumberg

It is certified that error appears in the above-identified patent and that said Letters Patent are hereby corrected as shown below:

Column 3, line 59, "out" should be -- our --;

Column 5, line 28, "iso-myl" should be -- iso-amyl --;

Column 5, line 30, "iso-myl" should be -- iso-amyl --;

Column 5, line 38, "TION MIXTURE" should be -- TION OF DISSOLUTION MIXTURE --; and Column 5, line 56, "phosphate rock," should be -- phosphate rock, a substantially iron-free liquor, from which iron-free --.

SIGNED AND SEALED
AUG 25 1970

(SEAL)
Attest:

Edward M. Fletcher, Jr.
Attesting Officer

WILLIAM E. SCHUYLER, JR.
Commissioner of Patents